United States Patent [19]

Hauk

[11] Patent Number: 5,170,884
[45] Date of Patent: Dec. 15, 1992

[54] CONTROL LEVER ASSEMBLY FOR SIGNALING DEVICES

[75] Inventor: Klaus Hauk, Altrip, Fed. Rep. of Germany

[73] Assignee: Deere & Company, Moline, Ill.

[21] Appl. No.: 601,086

[22] Filed: Oct. 22, 1990

[51] Int. Cl.$^5$ ............................................. H01H 3/02
[52] U.S. Cl. ................................. 200/17 R; 200/6 A; 200/61.54
[58] Field of Search .................. 200/6 A, 61.54, 17 R

[56]       References Cited
       U.S. PATENT DOCUMENTS

| 4,139,749 | 2/1979 | Scherzer et al. | 200/61.54 |
| 4,400,598 | 8/1983 | Jandl et al. | 200/16 D |
| 4,616,115 | 10/1986 | Potyka | 200/153 T |

FOREIGN PATENT DOCUMENTS 2620192 11/1977 Fed. Rep. of Germany .

Primary Examiner—Sharon D. Logan
Assistant Examiner—Michael A. Friedhofer

[57]       ABSTRACT

A lever assembly for the control of various electrical functions of a motor vehicle includes a hand operated control lever which is tiltable and rotatable with respect to and is supported by a base. A tension spring extends along a rotation axis of the control lever axis. One end of the spring is hooked to the control lever and the other end is coupled to the base, either directly or indirectly. The tension spring is hooked to a pin which is connected to the control lever and which simultaneously defines a tilt axis and forms part of a rotational stop mechanism.

An arm of the control lever receives a plunger to which a contact of a horn operating switch element is attached. A pair of turn signal micro-switches are attached to the base and can be operated by rotation of the control lever. A third, central, dimmer micro-switch is operated by tilting the control lever to a detent position defined by a control gate which is attached to the base.

17 Claims, 6 Drawing Sheets

CONTROL LEVER ASSEMBLY FOR SIGNALING DEVICES

BACKGROUND OF THE INVENTION

The invention concerns a lever assembly for motor vehicle signaling devices, such as directional signals, headlight dimmer switches, high beam flashers and/or horns.

Combination switches have been widely used in motor vehicles. By use of combination switches in passenger vehicles, frequently applied as knob-end switches on the direction signal control arms, a series of different signaling devices can be operated. As a rule control circuit contacts are thereby opened or closed, actuating control circuit components such as relays, which, in turn, operate signaling devices.

In agricultural machines, such as tractors, and in construction equipment, such signaling devices are not operated as frequently as in passenger vehicles, since the latter mostly participate in ordinary street traffic. Hence these controls are usually arranged on an instrument panel as separate switches.

For example, a switch for the control of a directional signal for an industrial transport vehicle has become known through DE-OS 26 20 192. This switch selectively actuates one of two circuits and is provided with a manual operating lever that can be rotated about an axis from a central neutral position into one of the two detent-held operating positions. In each of the operating positions the actuating arm of an electrical switch is depressed by a cam attached to the manual operating lever, performing a control operation.

The number of operating and control devices on the instrument panel of agricultural vehicles has recently increased by leaps and bounds. In order to preserve the clarity of the instrumentation it is desirable to concentrate several control functions in one control lever, without requiring additional auxiliary control mechanisms, such as relays, as is usual in passenger vehicles.

SUMMARY OF THE INVENTION

An object of the present invention is to provide a lever assembly of the aforementioned type, by which several control operations can be performed by the movement of one operating lever, which can be manufactured at low cost and without additional auxiliary control mechanisms, and which meets the electrical as well as the legal requirements both under SAE and EC regulations (i.e. both U.S. and European guidelines).

This and other, objects are achieved by to this invention in a lever assembly which includes a tension spring which couples an operating lever to a base. The tension of the tension spring pulls the control lever towards the base and retains it there, while permitting rotation and tilting of the control lever with respect to the base.

The operation of the horn is preferably performed by a plunger received in an upper part of the control lever, by forcing against each other two commercially available flat sliding contacts which are provided with electrical cables. A compression spring at the end of the plunger assures proper spacing of the contacts and returns the plunger to its original position after actuation. In addition, one of the flat sliding contacts retains the plunger in the upper part of the control lever. In place of the operation of the horn, the plunger can be used to perform a different operation. For example, operation of the plunger and closing of the contacts could be used to change a display in the instrumentation.

The operation of the blinker (right or left) is preferably provided by two micro-switches arranged in the base, which are operated alternately depending upon the direction of rotation of the control lever. Since these controls can be configured as selector switches, there is a multitude of possible electrical combinations, which are a great advantage for the standardization of the differing electrical systems for SAE and EC requirements.

A third micro-switch is mounted vertically in the center between the two switches for the blinker and controls the low beam/high beam function. This is actuated by pressing (tilting) the control lever. During a possibly simultaneous rotation of the control lever for blinking, this switch position remains unchanged, and can be canceled only by pulling the control lever.

The headlight flasher operation is performed preferably in the same manner as in common automotive usage by pulling the control lever of a turn signal switch. A commercial sliding contact on the lower part of the control lever is pressed against a commercial cable contact mounted under a connecting screw. The return to the original position is automatic, that is in the high beam flasher position no detent is engaged, but only a momentary operation performed.

With this lever assembly the most important signaling devices for operation in street traffic can be operated with a single control lever, so that some of the actuators previously required can be eliminated. Since operation of the control lever directly engages switch contacts, additional relays and the like can be eliminated. If necessary the switch contacts can be easily replaced. Double-throw switches may be used for the micro-switches, that permit a multiplicity of control options for the signaling devices, which minimizes the amount of wiring required, in order to meet the specifications in either the SAE or the EC areas.

DETAILED DESCRIPTION

Figure 1:
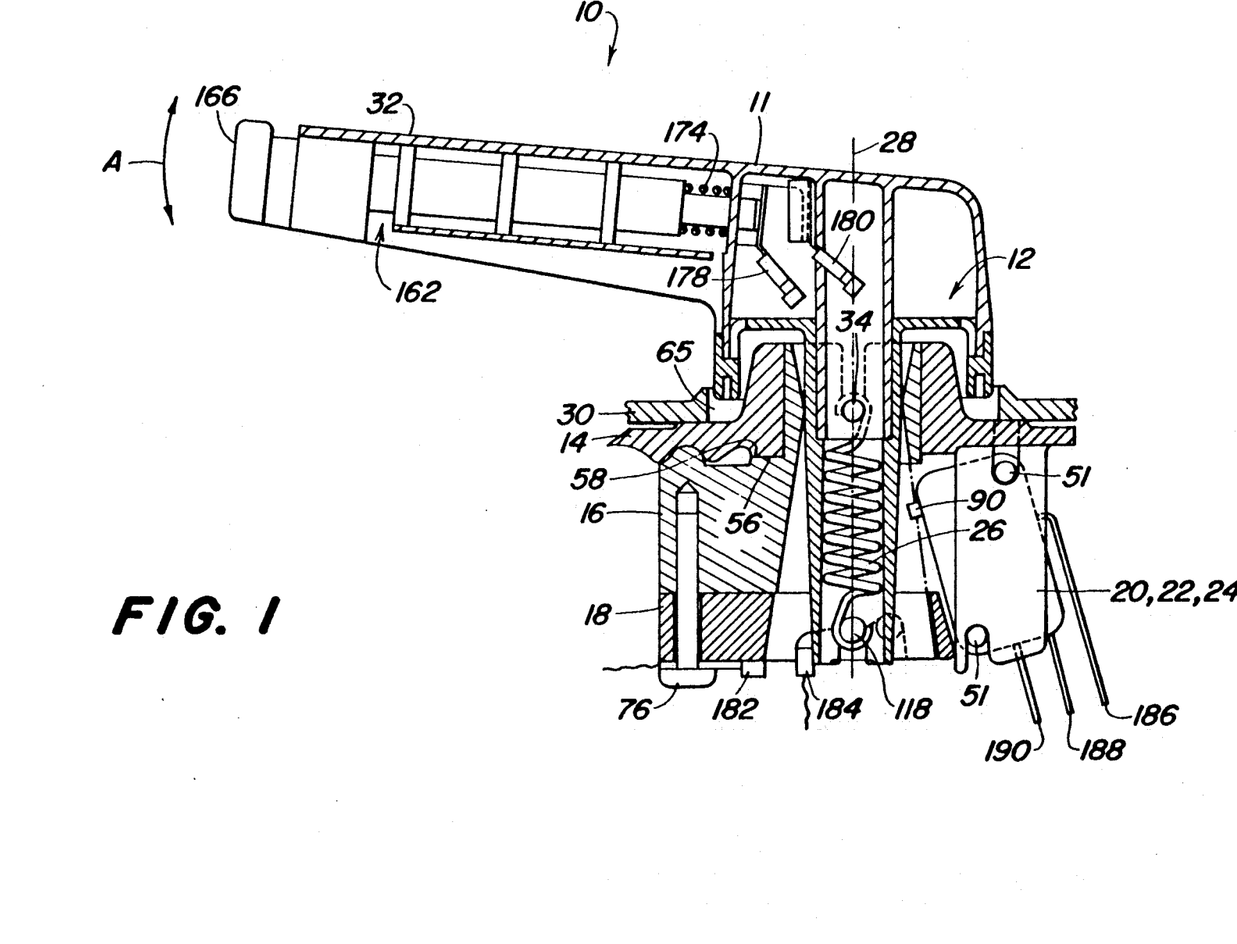
FIG. 1 shows a cross section of an assembled lever assembly according to the present invention.

FIG. 1 shows a control lever assembly which includes a control lever 10 with a handle part 11 and base part 12, a mounting base 14, a detent bearing 16, a control gate 18 and three micro-switches 20, 22, 24. The control lever 10, the base 14, the detent bearing 16 and the control gate 18 are preferably manufactured from an injection molded plastic and are held together by a tension spring 26. The control lever 10 with the detent bearing 16 and the control gate 18 can be rotated about axis 28. The base 14, which is attached to an instrument panel 30, and the switches 20, 22, 24 attached thereto, remain in their position during the rotation. The free end 32 of the handle 11, which projects at an angle, can be tilted from the rest position shown in the direction indicated by the double arrow A towards and away from the instrument panel 30. A pin 34 defines the axis of tilting of the control lever 10.

Figure 7:
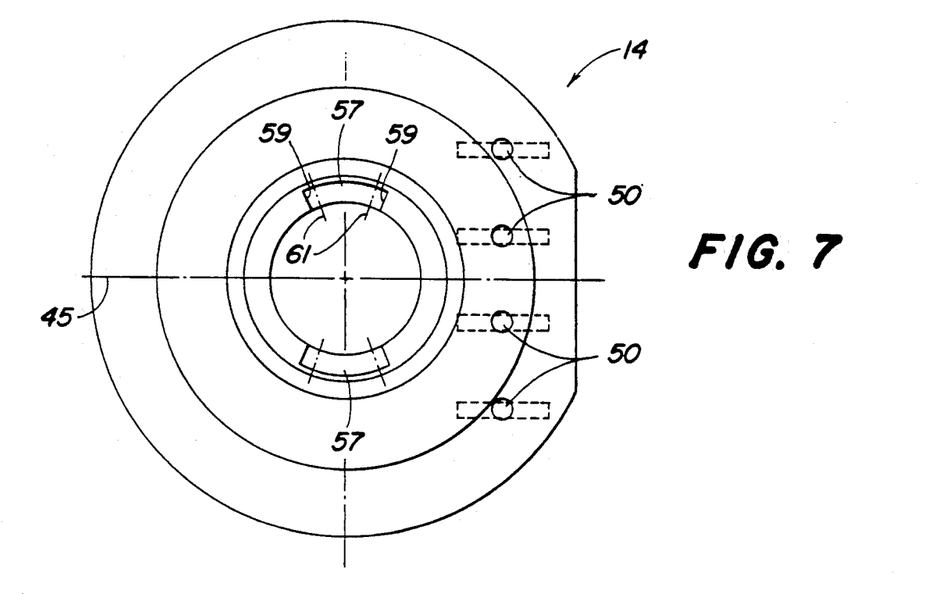
FIG. 7 is a plan view of a mounting base.
Figure 8:
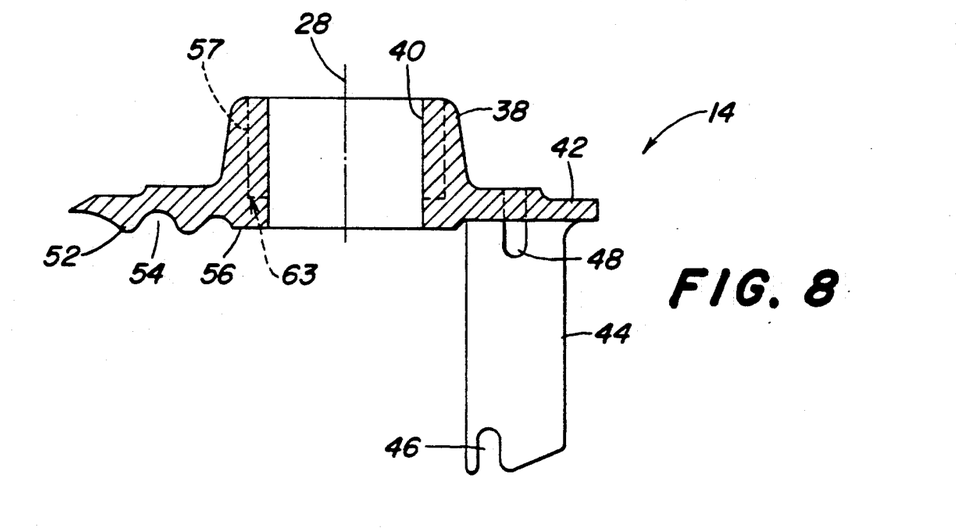
FIG. 8 is a sectional view of the mounting base.
Figure 9:
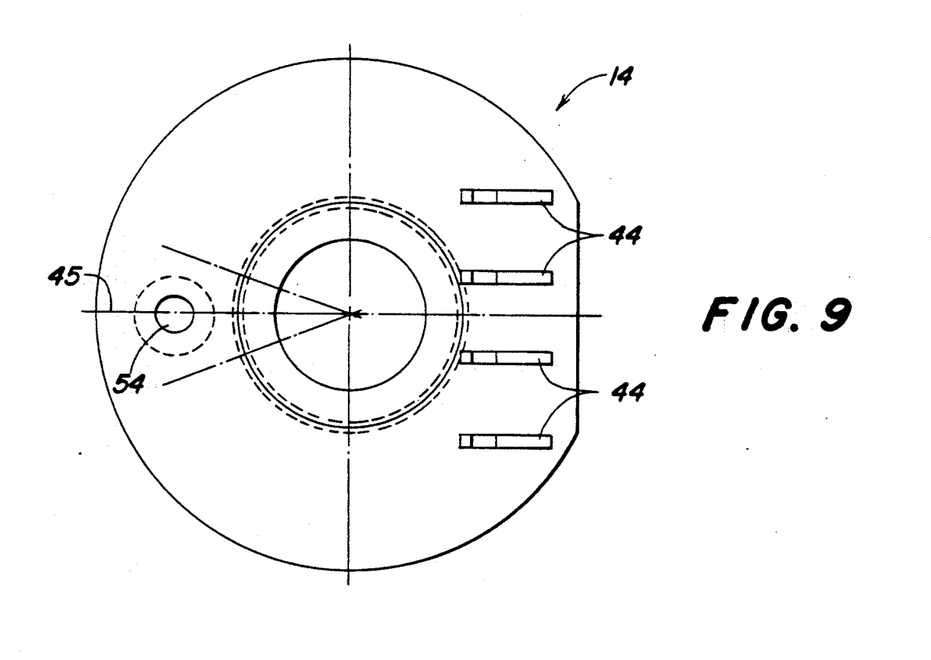
FIG. 9 is a bottom view of the mounting base.

The mounting base 14, as best seen in FIGS. 7, 8 and 9, is attached with screws or other appropriate means on the rear of the instrument panel 30 of a motor vehicle (not shown). The base 14 includes a hollow cylindrical hub 38 with an axial cylindrical 40 and with a flange 42 projecting generally radially from one end thereof. Four parallel, spaced apart intermediate walls 44 project from the rear side of the flange 42. The intermediate walls 44 are arranged symmetrically with respect to the center line 45. As best seen in FIG. 8, there is a slot-shaped axial recess 46 at the free end of each intermediate wall 44. A blind bore or recess 48 extends axially into the end of each intermediate wall 44 which faces towards the flange 42. For ease of manufacturing apertures 50 are located on the flange 42 in alignment with the blind bores 48. Micro-switches 20, 22 and 24 are mounted between the intermediate walls 44, as indicated in FIG. 1. The micro-switches 20, 22, 24 are provided with a hole at each of two diametrically opposed corners. Through these holes and the recesses 46, 48 in the intermediate walls 44 of the base 14 threaded pins 51 are inserted and tightened. An annular projection 52 which surrounds a generally spherical recess 54 is locate on the side of the flange 42 which faces detent bearing 16 and opposite the intermediate walls 44.

Two segment-shaped recesses 57 extend axially along opposite sides of the interior of the hub 38. When the lever assembly is assembled, the recesses 57 receive the ends of the radially oriented pin 34 which defines the tilt axis. The side walls of the recesses are engageable with the ends of the pins 34 to thereby limit the amount of rotation of the lever 10. As is described later in greater detail, a control operation is performed when the pin 34 engages a side wall of one of the recesses 57. Thus the recesses 57 perform two functions. They limit the degree of rotation of the control lever and establish detent positions 61, and they provide a contact surface 63 which engages the ends of the pin 34, absorbs the axial forces generated by the spring 26 and limits the axial movement of the control lever 10. This assures a minimum gap 65 between the control lever 10 and the base 14 which permits tilting of the control lever 10 and avoids excessive friction between the control lever 10 and the base 14. Rotation of the control lever 10 about axis 28 must generally overcome only the detent forces (recess 54 in the base 14 and projection 82 in the detent bearing) which depends in part on the force of the tension spring 26.

Figures 10, 12:
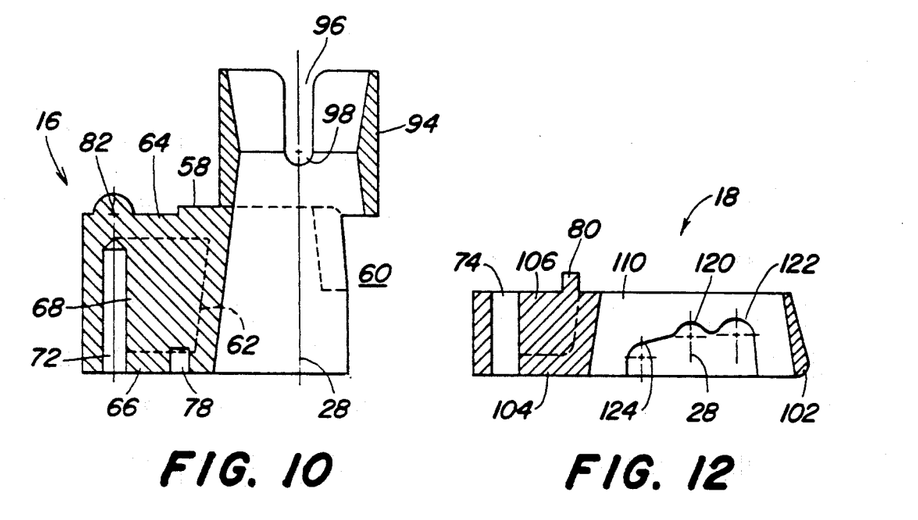
FIG. 10 is a sectional view of a detent bearing.
FIG. 12 is a sectional view of a control gate.

A contact surface 56 on the rear of the mounting base 14 slidably engages a contact surface 58 on the detent bearing 16, as best seen in FIG. 1. The detent bearing 16 includes a cone 62 which is partially open on one side 60 and which carries two collars 64, 66 which extend to one side of the axis 28 as last seen in FIG. 10. One collar 66 is located at the rear end of the cone 62, the other collar 64 is in the center part of the cone 62. A connecting wall 68 extends radially between the collars 64, 66 and widens to a cylinder 70 at its outer region. A threaded blind hole 72 extends into the cylinder 70 from the rear end. The hole 72 is aligned with a through hole 74 in the control gate 18, so that these two components can be assembled with a screw 76. In addition, the rear collar 66 has a blind bore 78 which receives a stub 80 which projects from the control gate 18 in the assembled condition. This prevents relative rotation between parts 16 and 18.

The center collar 64 carries a generally ball-shaped detent projection 82 which is receivable by the recess 54 on the rear side of the base 14. Upon rotation of the detent bearing 16 the projection 82 is forced out of the recess 54 and slides over the annular projection 52. The resulting axial movement of the detent bearing 16 is resisted by the force of the tension spring 26. As a result there are three detent positions, a central, a right and a left position, which can be reached by rotation of the control lever 10 about axis 28. The right and left detent positions are limited by the walls of the recesses 57.

Figure 11:
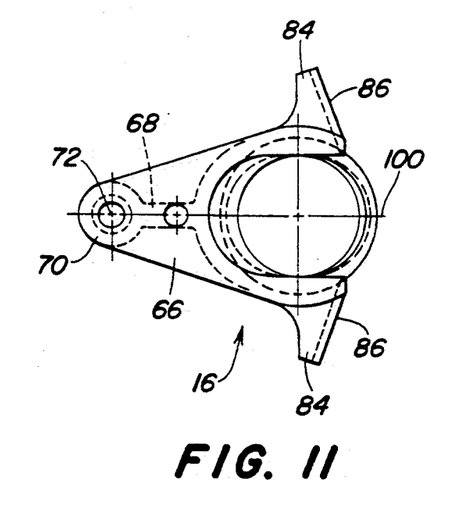
FIG. 11 is a bottom view of the detent bearing.

Alternatively, in place of the recess 54 and the projection 82, two recesses and projections arranged symmetrically to the control lever axis 28 could be used, although this is not illustrated. For example, one of the projections could be located on the bracket 84 of the detent bearing 16, yet to be described, on the side facing the base 14. For this purpose it is appropriate to configure the bracket 84 somewhat wider than is shown in FIG. 11. In this case the base 14 contains two recesses corresponding to the projections, arranged symmetrical to the control lever axis 28. In contrast to the embodiment with only one detent position, this embodiment has the advantage that during rotation of the control lever the detent bearing 16 does not tend to tilt since the forces are directed symmetrically to the axis 28.

Figure 14:
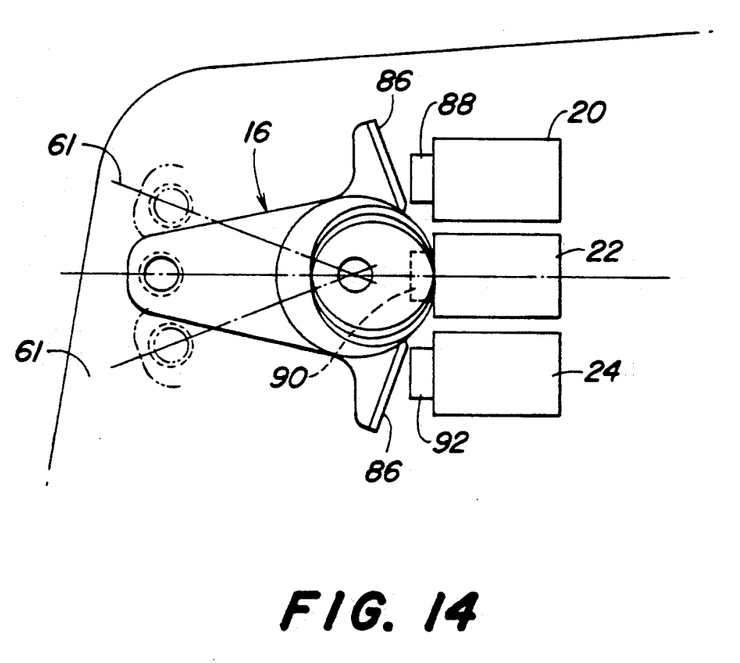
FIG. 14 is a plan view of the detent bearing according to FIGS. 10 and 11 with the position of micro-switches indicated.

The cone 62 of the detent bearing 16 is partially open to the side 60 away from the collars 64, 66 to form the space necessary for the micro-switches 20, 22, 24. Brackets 84 extend from both sides of the center collar 64 and from the cone 62 near the open end 60. As shown in FIG. 14, upon rotation of the detent bearing 16 from its central position, each bracket 84 carries a flank 86 which forces an actuating device 88 or 92 against one of the micro-switches 20, 24 to perform a switching operation.

The micro-switches 20, 24 control the vehicle turn signals via a conventional blinker (not shown). The micro-switches 20, 24 are preferably configured as double throw switches. These can accommodate alternative wiring arrangements that can comply with various regulations.

The cone 62 of the detent bearing 16 extends beyond the center collar 64 and forms a projection 94 with a cylindrical outer surface which is rotatably received by the bore 40 in base 14. The opposing side faces of the projection 94 are provided with slots 96 which open at the free end of the projection 94 and which extend parallel to the axis 28. The bottoms of the slots 96 engage the pin 34. The inner surface of the projection 94 forms two frustoconical potions which diverge from a location near the bottom of the slot 96. These frustoconical potions are oriented in the direction of the collars 64, 66, but not in the direction of the slots 96. These frustoconical portions make possible the tilting of the lever 10 within the plane 100.

Figure 13:
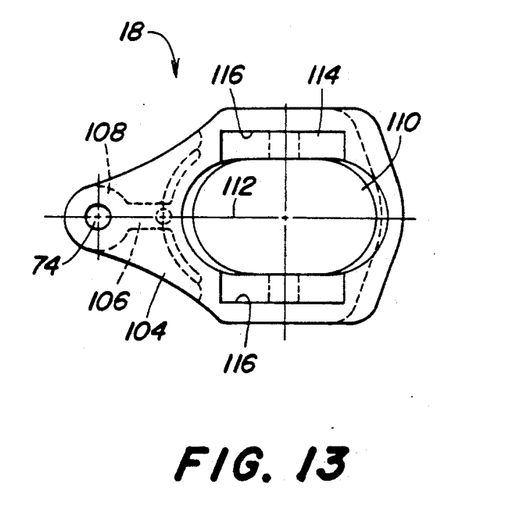
FIG. 13 is a bottom view of the control gate.

The control gate 18 is bolted to the detent bearing 16. The control gate 18 is illustrated in greater detail in FIGS. 12 and 13. The control gate 18 includes a hollow cone portion 102 to one side of which a collar 104 and a radial web 106 are attached. At its outer free end the web 106 widens to a cylinder 108 through which extends hole 74. When the lever assembly is assembled, the control gate axis coincides with the rotational axis 28 of the control lever 10. The hollow cone portion 102 surrounds a non-cylindrical bore 110 which has a generally oval cross sectional shape. Along plane 112 which contains the web, the bore 110 widens conically in the downward direction viewing FIG. 12 and away from the base 14.

A pair of guide channels 114 are formed on opposite sides of the surface of bore 110 and are arranged symmetrically about the plane 112. The guide channels 114 have side walls 116 which are spaced apart by a distance which corresponds approximately to the length of a gate pin 118, which is guided in the guide channels 114 and which can be moved sideways. One end of the tension spring 26 is hooked to the pin 34 and the other end of the tension spring 26 is hooked to pin 118. An end surface of each guide channel 114 forms a central notch 120 which is aligned with axis 28, a detent notch 122 which is positioned on one side of axis 28, and an abutment surface 124 which is positioned on the other side of axis 28. The force of the spring 26 retains the pin 118 in a fixed position in notches 120, 122, so that no independent tilting can occur. Accordingly, the pin 118 can be held in stationary central and offset positions in notches 120 and 122, respectively. The surface 124 has a tapered run-out portion which will engage the pin 118 as a result of a tilting force. This abutment surface 124 does not provide a stable position for the pin 118. Upon a reduction of the tilting force the pin 118 will return to the central notch 120. The shape of the notches 120, 122 and of surface 124 forms a gate track, resulting in two detent positions and one momentary position that can occur upon tilting of the control lever 10.

Figure 2:
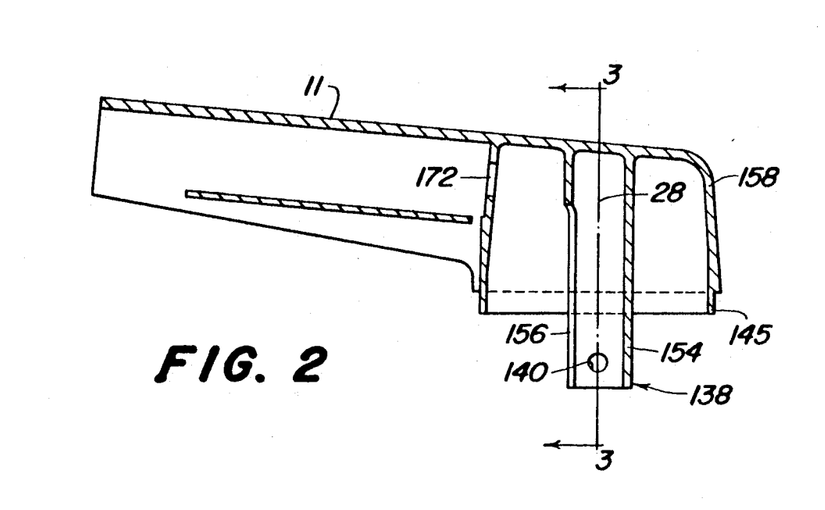
FIG. 2 shows the longitudinal section of the handle part of a control lever.
Figure 3:
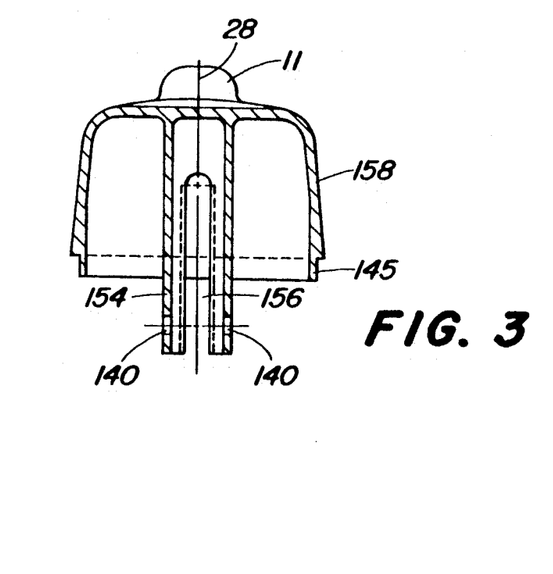
FIG. 3 shows a sectional view along line 3—3 of FIG. 2.

As best seen in FIGS. 2 and 3, the upper part 10 of the control lever includes a tube 154 which includes a facing surface 138 and the hole 140. The tube 154 is provided with a longitudinal slot 156 through which electrical wires can be installed. The tube 154 is surrounded by a housing 158 which terminates in a lip 145. A lever handle 160 projects from the housing 158 at an angle with respect to the axis 28. The lever 160 can be rotated or tilted with respect to the rotational axis 28 within the limits controlled by the contact surfaces 59 of the base 14, which is accomplished by moving handle 160 away from or towards the instrument panel 30.

Figure 5:
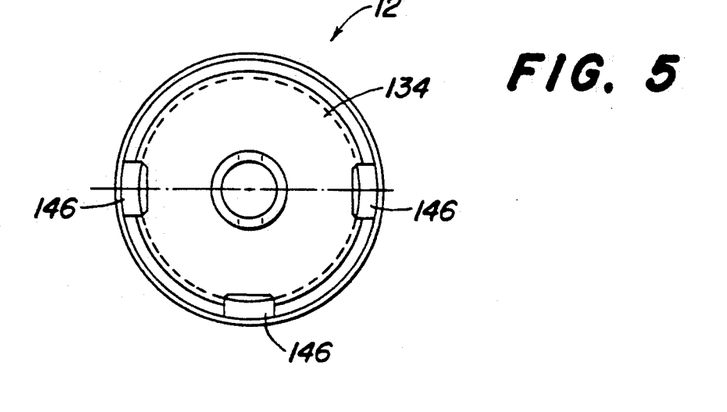
FIG. 5 is a plan view of a base or lower part of a control lever.
Figure 6:
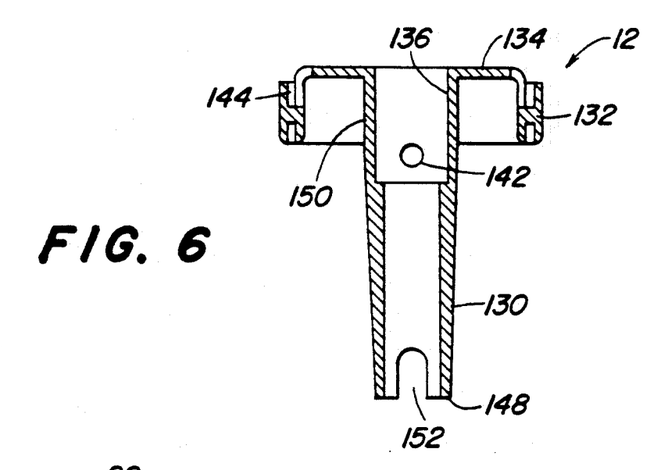
FIG. 6 is a cross section of the base or lower part of the control lever.

As best seen in FIGS. 1, 5 and 6, the lever lower part or base 12 includes a tube 130, at whose upper end is attached a flange 134 with a rim 132. The rim 132 forms a circular groove 144 which receives the rim 145 of the housing 158 so as to assure a stable connection between the two parts 11 and 12. In order to avoid any damage in this area due to overload (rotation) the engaging parts can be provided with teeth. In addition both parts 11 and 12 are so proportioned relative to each other that they form a closed space and thereby protect the contacts for the horn operations described below against intrusion of water and dust. Openings 146 in the rim 132 permit drainage of condensation or splash. A cylindrical bore extends axially through the tube 130, whose upper section 150 receives a tube 138 which projects from the upper part 11 of the control lever 10. Bore 142 extends radially through the part 130.

The pin 34 is inserted into corresponding holes 140, 142 parts in mechanically connects the tube 130 with the tube 138. The pin 34 also forms the tilt axis for the control lever 10. Accordingly, the pin 34 performs a multitude of functions. The tension spring 26 is hooked to it, it defines the tilt axis of the entire mechanism, it connects both parts of the control lever 10, it serves as stop for the right and left rotation, and it assures a minimum gap between the control lever 10 and the base 14.

The outside diameter of the section of the tube 130 located somewhat below the rim 132 corresponds to the smallest inside diameter in the projection 94 of the detent bearing 16, providing a positive connection. The two parts here form a bearing in the axis of the pin 34 and about which the control lever 10 can be tilted.

The tube 130 has a slight conical taper towards its free end 148. In this region the cylindrical recess has a diameter that permits free axial movement of the tension spring 26. An axial slot 152 extends towards the free end 148 of the tube 130. The pin 118, which is carried in the guide channel 114 of the control gate 18, is guided in this slot 152 in such a way that a tilting movement of the control lever 10 is transmitted to the pin 118 and moves it in the guide channel 114.

Figure 4:
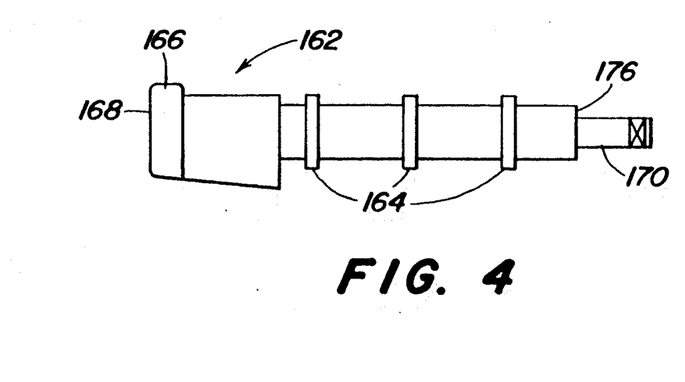
FIG. 4 shows a side view of a plunger.

As best seen in FIG. 1, a plunger 162 is received within the handle 11. The plunger 162 is shown in greater detail in FIG. 4, and includes guide webs 164 which engage the inner wall of the handle 11. An actuating button 166 is carried at one end the plunger 162. Pressure may be applied axially by hand to the surface 168 of button 166 in order to move the plunger 162 in the handle 11. The other end 170 of the plunger 162 is tapered. During assembly a compression spring 174 is pushed over the end 170 and seated on a shoulder 176 of the plunger 162. Then end 170 is inserted through an opening 172 in the housing 158 so that the other end of spring 174 is seated against the housing 158. The compression spring 174 guarantees that when the plunger 162 is unloaded, the button 166 will project out from the end of the handle 11.

An electrical contact 178 is attached to the end 170 of the plunger 162. This contact 178 operates as a stop and prevents the plunger 162 from moving too far to the outside under the force of the compression spring 174. The contact 178 is also engageable with another contact 180 which is attached to the tube 138 of the control lever 10, thus forming a switch. If the plunger 162 is depressed by applying pressure to the actuating button 166 and is moved against the force of the spring, the contacts 178, 180 make electrical contact and the switch closes an electrical circuit. These switch elements may appropriately connect an acoustic horn (not shown) with the vehicle battery (not shown). The electric wiring (not shown) is routed through the longitudinal slot 156 of the upper part of the control lever 10, through the tension spring 26 and then behind the instrument panel 30.

The screw 76 attaches a contact 182 to the rear side of the control gate 18 in such a way that it partially engages the cone-shaped recess 110 in the control gate 18. This contact 182 is opposed by an additional contact 184 which is attached to the free end 148 of the base 12 of the control lever 10. These two contacts 182, 184 form a switch that can close an electric circuit when the free end 32 of the control lever 10 is pulled away from the instrument panel 30 and the control lever 10 tilts about the tilt axis defined by pin 34. This tilted position is a momentary position wherein the control lever 10 will return to its central rest position upon its release, since the pin 118 is not received by detent notches 120 or 122, but instead engages the abutment surface 124 of the control gate 18. The switch formed by the contacts 182 and 184 may be part of a vehicle high beam electric circuit (not shown).

The actuator 90 of the central micro-switch 22 lies in the operating region of the tube 130. If the free end 32 of the control lever 10 is pressed towards the instrument panel 30, the control lever 10 will tilt about pin 34 and the tube 130 presses against the actuating device 90 and switches the switch 22. The control lever 10 remains in this tilted position since the pin 118 engages the notch 122 of the control gate 18. The micro-switch 22 is preferably configured as a double throw switch whose center pole 186 is connected to a pole of the vehicle battery (not shown), and whose other terminals 188, 190 are connected to the high beam and the low beam connections of the headlights (not shown). By tilting the control lever 10 from a central position towards or away from the instrument panel 30, a switch is performed between the high beam and low beam settings.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A lever assembly for actuating vehicle electrical system switches, the lever assembly comprising:
   a control lever;
   a base;
   means for tiltably and rotatably supporting the control lever on the base;
   a plurality of switch elements attached to the base and actuatable by rotating the control lever;
   a tension spring extending along an axis and coupling the control lever to the base, the tension spring retaining the control lever to the base and permitting the control lever to rotate and tilt with respect to the axis;
   a pivot pin oriented perpendicular to the axis, the pin engaging the control lever and having ends which are supported by the base, and one end of the tension spring is hooked to the pin; and
   detent means for releasably holding the control lever in selected positions, the detent means comprising a rotating detent bearing attached to the control lever and engaging a rear side of the base, the detent bearing and the base cooperating together to form detent positions by means of which the selected positions are defined.

2. The lever assembly of claim 1, wherein:
   the control lever is pivotally coupled to the detent bearing by means of the pivot pin, so that the detent bearing does not participate in tilting movements of the control lever.

3. The lever assembly of claim 1, wherein:
   the detent bearing is provided with a projection which is receivable by a recess in the base when the control lever is in one of the selected positions.

4. The lever assembly of claim 1, wherein:
   the detent bearing includes a bore extending therethrough, the control lever having a shaft which is received by the bore and retained therein by the pivot pin, and the bore having a conical shape in the plane of the tilting motion of the control lever.

5. The lever assembly of claim 1, wherein:
   a control gate is attached to a side of the detent bearing opposite the base, the control gate having a plurality of detent recesses formed therein;
   a portion of the control lever carrying a detent pin which is engageable with the detent recesses to define selected tilt detent positions of the control lever; and
   the tension spring having one end hooked to the pivot pin and a second end hooked to the detent pin.

6. The lever assembly of claim 5, wherein:
   at least one of the control gate detent recesses will receive the detent pin and hold the control lever in a stable detent position when an operator releases the control lever; and
   the control gate forming an abutment surface which engages the detent pin when the control lever is moved to an unstable position, the abutment surface permitting the detent pin to move so that the control lever can return to a rest position when an operator releases the control lever when the control lever is in said unstable position.

7. The lever assembly of claim 6, wherein:
   at least one electrical contact is attached in the region of the control gate, which, together with at least one electrical contact attached to the control lever, forms a switch.

8. The lever assembly of claim 7, wherein:
   the switch is closed only upon tilting of the control lever to its unstable position.

9. The lever assembly of claim 5 wherein:
   the control lever includes a shaft which extends through the base and which, upon movement of the control lever, operatively engages at least one switch which is mounted on the base.

10. The lever assembly of claim 9, wherein:
    the at least one switch is actuated when the control lever is tilted to a detent held position.

11. A lever assembly for actuating vehicle electrical system switches, the lever assembly comprising:
    a base;
    a control lever, the control lever including a shaft which extends through the base;
    means for tiltably and rotatably supporting the control lever on the base;
    a plurality of switch elements attached to the base and actuatable by rotating the control lever;
    a tension spring extending along an axis and coupling the control lever to the base, the tension spring retaining the control lever to the base and permitting the control lever to rotate and tilt with respect to the axis; and
    a detent bearing is coupled to the shaft, the detent bearing having a bracket which, upon rotation of the control lever and the detent bearing, operates at least one switch.

12. The lever assembly of claim 11, wherein:
    first and second brackets are attached to the detent bearing on opposite sides of an axis of the shaft, each bracket operating a switch only when the control lever is rotated about the shaft axis from a center position.

13. A lever assembly for actuating vehicle electrical system switches, the lever assembly comprising:
- a control lever;
- a base;
- means for tiltably and rotatably supporting the control lever on the base;
- a plurality of switch elements attached to the base and actuatable by rotating the control lever, including three micro-switches which are mounted on a side of the base in an array which extends perpendicular to the spring axis; and
- a tension spring extending along an axis and coupling the control lever to the base, the tension spring retaining the control lever to the base and permitting the control lever to rotate and tilt with respect to the axis, a central one of the switches being operated by a tilting movement of the control lever, and the other of the switches being operated by a rotational movement of the control lever.

14. A lever assembly for actuating vehicle electrical system switches, the lever assembly comprising:
- a control lever;
- a base;
- means for tiltably and rotatably supporting the control lever on the base;
- a plurality of switch elements attached to the base and actuatable by rotating the control lever;
- a tension spring extending along an axis and coupling the control lever to the base, the tension spring retaining the control lever to the base and permitting the control lever to rotate and tilt with respect to the axis;
- the control lever comprises a lower part and an upper part, the upper part extending at an angle with respect to an axis of rotation of the control lever;
- the lower part has a sleeve;
- the upper part has a tube which is received by and connected to the sleeve, the sleeve and the tube each having a hole extending perpendicular to said rotation axis; and
- a pin is received by the holes and defines a tilt axis.

15. The lever assembly of claim 14, wherein:
the lower part of the control lever includes a cylindrical housing which partially receives a projecting portion of the base, the housing having a rim which extends away from the upper part, the sleeve of the lower part being concentric with said rotation axis, extending through an opening in the base and receiving the tension spring.

16. The lever assembly of claim 15, wherein:
- a slot is formed in a free end of the sleeve; and
- a rod is received by the slot, one end of tension spring being hooked to the rod.

17. The lever assembly of claim 16, wherein:
- the rim is provided with a circular groove which opens towards the upper part and which receives an end of a housing portion of the upper part of the control lever; and
- the tube of the upper part is received by a cylindrical recess in the sleeve of the lower part of the control lever.

* * * * *